Aug. 3, 1965 J. F. KRUY 3,198,960

SHIFT REGISTER UTILIZING A HOLDING PULSE TO OBVIATE INTERSTAGE SIGNAL STORAGE MEANS

Filed April 24, 1962

INVENTOR.
JOSEPH F. KRUJ

BY Henry L. Hanson

ATTORNEY

United States Patent Office 3,198,960
Patented Aug. 3, 1965

3,198,960

SHIFT REGISTER UTILIZING A HOLDING PULSE TO OBVIATE INTERSTAGE SIGNAL STORAGE MEANS

Joseph F. Kruy, West Newton, Mass., assignor to Honeywell Inc., a corporation of Delaware Filed Apr. 24, 1962, Ser. No. 189,807
10 Claims. (Cl. 307—88.5)

This invention is concerned with new and improved electronic data storage apparatus and particularly with an improved shift register circuit for digital data utilizing tunnel diode storage elements.

Shift register circuits are used in digital data handling systems for storing digital data and for moving such data from one position to another. Such circuits generally include a number of cascaded, bistable stages, interconnected so that each stage is adapted to assume the bistable state of the preceding stage upon command of a shift signal.

In many data handling systems, the bistable stages of a shift register have taken the form of two-transistor regenerative circuits, or flip-flop circuits, whereby the transistors are alternately switched from a cut-off to a fully conductive or saturated state. The bilevel output signals thus produced are related to binary informational units. It is recognized, however, that the aforementioned switching action does not occur instantaneously but occurs at a rate determined mainly by the switching speed of the associated transistor elements. As a result, the output signals derived from the individual shift register stages differ in wave shape and vary in response time with changes in the transistor operating parameters. The effects of such variances may become particularly objectionable when the shift register circuit is operated in high-speed data handling applications and the output signals therefrom are utilized during a brief time interval. If a bistable stage has not completed its switching cycle when interrogated, the output information therefrom may be inadvertently discarded.

It is, therefore, an object of the present invention to provide a new and improved shift register circuit whose output signal wave forms are independent of the switching characteristics of the active elements within each shift register stage and the timing of the shifting operation is thereby made more flexible.

In the past, it has been necessary to provide a signal storage facility between adjacent shift register stages in order to ensure that an individual stage will transfer its stored information prior to the application of an incoming information pulse. This has been most often accomplished by means of additional transistor storage circuitry or by means of resistor-condenser integration networks which provide a signal delay period sufficient to exceed the time duration of the shift-inducing signal. The first-mentioned method of signal transfer greatly increases the circuit cost and signal synchonizing complexity, while the latter method acts to confine the operational speed of the shift register circuit to very narrow limits.

It is, therefore, another object of the present invention to provide a shift register circuit which obviates the need for an interstage signal storage facility.

It is a further object of the present invention to provide a shift register circuit having a greatly reduced number of components that might be subject to failure to thereby improve the system reliability.

In accordance with the teachings of the present invention, each stage of the shift register circuit includes tunnel diode-transistor hybrid circuitry, whereby the high-speed storage facility of the tunnel diode is combined with the signal amplification properties of the transistor so as to take optimum advantage of the useful characteristics inherent in each device together with the distinct advantages realized from the combination.

It is, therefore, a further object of the present invention to provide a new and improved shift register circuit having tunnel-diode, transistor-shift-register stages.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawing and descriptive matter in which there is illustrated and described a preferred embodiment of the invention.

Briefly, the shift register circuit of the present invention includes a number of tunnel diode semiconductor devices which are biased to operate in their bistable mode. The base-emitter elements of a transistor switch are connected in parallel with each tunnel diode such that when the associated tunnel diode is switched to its high-voltage stable state, by means of a shift pulse signal, the transistor associated therewith becomes conductive in its base-emitter path; conversely, when the tunnel diode is switched to its low-voltage stable state, by means of a digital input signal, the base-emitter path of the associated transistor is made non-conductive. In the absence of input digital information, each of the transistors in the shift register circuit is preset to its conductive state, hereinafter referred to as the binary "ZERO" state. The storage of a binary "ONE" in a shift register stage is indicated by the switching of the associated transistor from its conductive to its non-conductive state.

In order to avoid variations in the time occurrence of an output signal produced by this change of state, the collector electrode of the transistor switch is maintained at its normally conductive potential during the application of input information pulses by means of a hold-pulse signal. This hold-pulse signal occurs in synchronism with the input and shift pulse signals and has a time duration which exceeds the switching time of the transistor. The turn-off of current flow in the base-emitter path of the transistor will therefore have no immediate effect on the collector electrode potential. Upon release of the hold-pulse signal, however, the collector electrode rises towards its non-conducting potential at a rate which is now determined by the decay time characteristic of the hold-pulse signal.

During the next operating interval, when the hold-pulse signal is first applied to the non-conducting transistor, the collector voltage of the transistor will change from the negative voltage level to the potential of the hold-pulse signal, which may approximate ground potential. A positive-going output signal will therefore be immediately transferred to the succeeding shift register stage. The amplitude and rise time of this signal will be determined by the rise time characteristics of the hold-pulse signal and will be unaffected by the slow energizing speed of the transistor. Thus, with the circuit of the present invention it becomes possible to produce output signals from each register stage having uniformly fast rise and decay times and to accurately establish the time occurrence of these signals.

Figure 1:
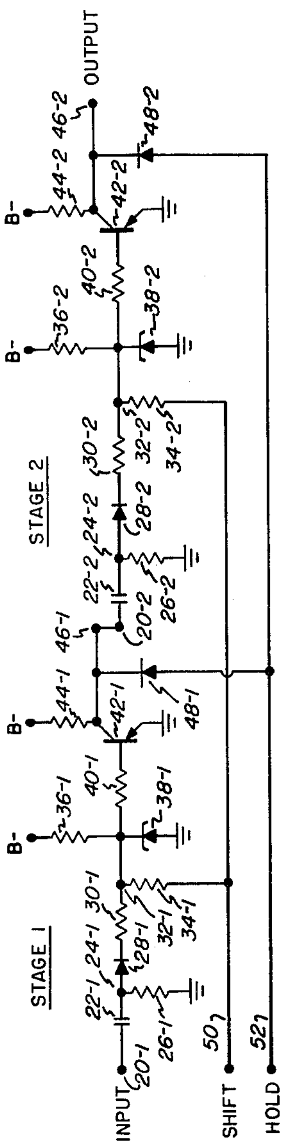
FIGURE 1 is a schematic diagram of a preferred embodiment of the present invention.

Referring now to FIGURE 1 of the drawing, there is shown a preferred embodiment of the present invention which includes a pair of shift register stages 1 and 2. Although only two shift register stages have been shown in the drawing, any number of such stages may be cascaded or serially connected to form a shift register circuit having the information storage capacity required for a particular application. Since the circuitry within each of the shift register stages is identical, components which perform the same function in each stage have been given the same prefix numeral while the suffix numeral indicates the shift register stage in which the component is located.

Each of the shift register stages 1 and 2 will be seen to have an input terminal 20 to which is connected one end of a coupling condenser 22. The other end of condenser 22 is connected to a junction point 24 which also joins the anode of a diode 28 and one end of a resistor 26. The other end of resistor 26 is connected to ground while the cathode of diode 28 is coupled by way of a resistor 30 to a junction point 32. The junction point 32 further connects one lead of a resistor 34, a resistor 36, a resistor 40 and the cathode of a tunnel diode 38. The other lead of resistor 34 is connected to a common shift pulse line 50 while the other lead of resistor 36 is connected to a negative D.C. source B−. The other lead of resistor 40 is connected to the base element of a transistor 42 which has its emitter element connected to ground together with the anode of tunnel diode 38.

The collector element of transistor 42 is coupled to the negative D.C. source B− by means of a resistor 44 and is further connected to an output line 46 and to the cathode of a diode 48. The anode of diode 48 is connected to the common hold-pulse line 52. The input terminal 20–1 of the shift register stage 1 has been designated as the input terminal 46–1 of shift register stage 1 is directly connected to the input terminal 20–2 of shift register stage 2. The output terminal 46–2 of shift register stage 2 becomes the output terminal for the shift register circuit of FIGURE 1.

In order to best describe the operation of the preferred embodiment of the shift register circuit shown by FIGURE 1, a brief description of the operation of a tunnel diode, such as the tunnel diodes 38 of FIGURE 1, will be made with reference to the tunnel diode voltage-current characteristic curve illustrated in FIGURE 2.

Figure 2:
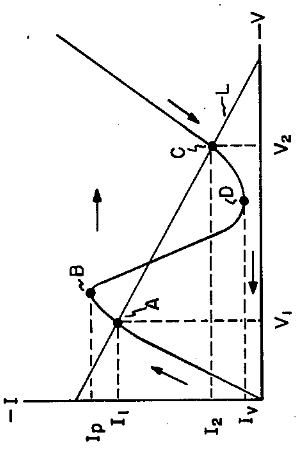
FIGURE 2 is an illustration of the voltage-current characteristic curve of a tunnel diode.

As shown by FIGURE 2, the tunnel diode characteristic curve exhibits a negative-resistance region flanked by a pair of positive-resistance regions and separated from the latter by a pair of instability points B and D. By a proper choice of the biasing potential and the resistance connected in series with the tunnel diode, a D.C. load line L may be established which intersects the tunnel diode characteristic curve at a pair of stable operating points A and C. The tunnel diode is therefore said to be biased in its bistable mode, whereby the quiescent current-voltage parameters will be $I_1$, $V_1$, respectively when the tunnel diode is set to its stable operating point A, and $I_2$, $V_2$, respectively when the tunnel diode is set to its stable operating point C.

When it is desired to switch the operating point of the tunnel diode from point A to point C, the negative current flow through the tunnel diode is increased from the quiescent current level $I_1$ to a current level which exceeds the peak current $I_p$ at the instability point B. The operating point of the tunnel diode will follow the characteristic curve from the stable operating point A to the peak current point B, will immediately transfer to the equivalent current point on the other positive-resistance region of the tunnel diode characteristic curve and, upon termination of the additive current pulse, will settle at the stable operating point C. Conversely, to switch the operating point of the tunnel diode from point C to point A, the negative current flow through the tunnel diode is decreased to a value less than the valley current $I_v$ at the instability point D. The operating point will follow the characteristic curve of the tunnel diode from point C to the valley current point D, will immediately transfer to the equivalent current point on the other positive-resistance region of the tunnel diode characteristic curve and, upon termination of the opposing current pulse, will settle at the stable operating point A.

In the present invention, the tunnel diode and the biasing parameters therefor have been chosen such that the voltage $V_2$ at the stable operating point C will be of a sufficient magnitude to overcome the base-emitter threshold level of the associated transistor, to place the latter in a conductive state. The voltage $V_1$ at the stable operating point A is selected to be less than the base-emitter threshold voltage level of the associated transistor whereby the transistor will be non-conductive in its base-emitter path.

The operation of the circuit shown in FIGURE 1 will now be described in the instance when an external input signal is applied to the input of the first shift register stage and is thereafter transferred to the subsequent shift register stages. It is first assumed that each of the tunnel diodes 38 has been set to its high-voltage stable state by the application of a series of shift pulses to the shift line 50. Each of the transistors 42 will therefore be conductive in its base-emitter path, the base-emitter current therethrough being controlled by the value of the series-connected resistors 40. Resistors 40 are usually, but not necessarily, chosen so as to allow sufficient current to flow through the base-emitter paths of transistors 42 to place them in their fully conductive or saturated state. The collector elements of transistors 42 therefore, will attain a conducting level approaching ground potential. The presence of a ground-level signal at the collector element of a transistor indicates that the associated shift register stage is in the binary "ZERO" state.

Figure 3:
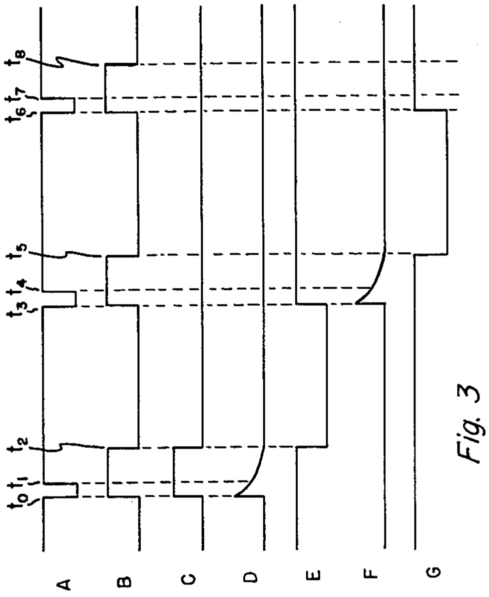
FIGURE 3 illustrates a series of wave forms which are helpful in forming an understanding of the operation of the present invention.

At a time $t_0$, a negative-going shift pulse signal such as that shown in FIGURE 3A, is applied to the common shift line 50. This signal is coupled to the tunnel diodes 38 by way of the current-limiting resistors 34 whereby additional negative current flow is provided through each of the tunnel diodes 38. This current flow adds to the quiescent current $I_2$ through the tunnel diodes 38 established by way of the negative potential source B− and resistors 36, and this additional current is in a direction so as to force the operating point of the tunnel diodes from the stable operating point C shown in FIGURE 2, to a point further along the same positive-resistance region. Upon termination of the shift-pulse signal, the operating point of the tunnel diode will revert back to the stable operating point C.

If it is desired to store a binary "ONE" in the first shift register stage, a positive-going signal, such as that shown in FIGURE 3C, is applied to the input terminal 20–1 of shift register stage 1 at the time $t_0$. This signal will be differentiated by means of the condenser 22–1 and resistor 26–1 resulting in the wave form shown by FIGURE 3D. Upon the termination of the shift pulse signal at the time $t_1$, the differentiated input pulse will still be sufficiently positive to oppose the quiescent current through the tunnel diode 38–1 and cause the latter to switch from its high-voltage stable state, such as that indicated at point C of FIGURE 2, past the valley current point D and to the stable operating point A. The reduced voltage $V_1$ across tunnel diode 38–1 will be below the conducting threshold level of transistor 42–1 and the base-emitter current flow therethrough will cease.

Normally, the voltage at the output terminal 46–1 would tend to rise towards the negative potential source B− at a rate determined by the switching speed of the transistor. As previously mentioned, this switching speed varies in accordance with changes in the characteristics of the transistor. Note, however, that the collector potential of transistor 41–1 is held at ground level during the time interval $t_0$ to $t_2$ by means of the hold-pulse signal shown in FIGURE 3B. Therefore, although the tunnel diode 38–1 has switched to its low voltage stable state and the transistor 42–1 is non-conductive in its base-emitter path, the collector 46–1 is prevented from returning to the B— level at this time because of the clamping action of the hold-pulse signal. The time interval between $t_1$ and $t_2$ is is made sufficiently long to allow the complete decay of current flow in the base-emitter path of transistor 42–1.

At the time $t_2$, the hold-pulse signal is removed and the collector 46–1 of the non-conducting transistor 42–1 rises towards the B— potential at a rate determined by the fall time or trailing edge of the hold-pulse signal. This signal is shown at the time $t_2$ in FIGURE 3B. The storage of a binary "ONE" in shift register stage 1 is indicated by the negative-going signal at the collector of transistor 42–1 shown in FIGURE 3E starting at the time $t_2$.

At the time $t_3$, the negative-going shift pulse signal is again applied to the common shift line 50, causing the tunnel diode 38–1 to switch back to its high-voltage state. This in turn causes the base-emitter path of transistor 42–1 to become conductive. Normally, the output signal at the terminal 46–1 would go positive at a rate governed by the energizing speed of transistor 42–1. Note, however, that at the time $t_3$, the positive-going hold pulse is again applied to the common hold-pulse line 52. This will cause the collector element of transistor 42–1, which was at B— potential, to be brought immediately to ground potential. This positive-going output signal is transferred to the differentiating network comprising condenser 22–2 and resistor 26–2 to produce the differentiated signal shown by FIGURE 3F. The differentiated signal is of the correct polarity to be coupled through the diode 28–2 and, upon termination of the shift pulse signal at the time $t_4$, will be sufficiently positive to cause the tunnel diode 38–2 to assume its low-voltage stable state. Current flow will therefore cease in the base-emitter path of transistor 42–2. Since the collector of transistor 42–2 is maintained at ground potential by the action of the hold-pulse signal, the binary "ONE" signal which has been shifted from stage 1 will not be observed at the collector 46–2 during this transient period.

Upon release of the hold-pulse signal at the time $t_5$, the collector of transistor 42–1, which has been switched to its conductive state, will remain at ground potential in the absence of a further input pulse at the terminal 20–1, while the collector of transistor 42–2, which has been switched to its cut-off condition by the differentiated output signal from shift register stage 1, will go negative at a rate determined by the fall time of the trailing edge of the hold-pulse signal. The wave form at the collector of transistor 42–2 is shown by FIGURE 3G where the storage of the binary "ONE" in shift register stage 2 is indicated by the negative-going signal starting at the time $t_5$.

At the time $t_6$, the hold-pulse signal is again applied to the hold-pulse line 52, causing the collector of the non-conducting transistor 42–2 to rise towards ground potential. A concurrent negative-going current pulse on the shift line 50 will cause the tunnel diode 38–2 to revert back to its high-voltage stable state. Consequently, upon release of a hold-pulse signal at the time $t_8$, the collector of transistor 42–2, which in FIGURE 1 is also the output of the shift register circuit, will remain at ground potential.

A circuit has been described whereby a positive-going information input pulse, which has been designated as a binary "ONE" signal, has been stored in the first of a plurality of shift register stages. Successive application of shift-pulse and hold-pulse signals has caused this binary "ONE" signal to be transferred to the succeeding shift register stages. Unlike prior art circuitry, the output signals derived from each of the shift register stages are independent of the switching characteristics of the active transistor elements. Moreover, it becomes unnecessary to use interstage delay networks or the like to temporarily store information until a succeeding stage has been reset. Since the amplitude, wave shape and time occurrence of the output signals are predictable, it becomes an easy matter to synchronize the operation of the shift register with further electronic circuitry.

The bias voltage polarity and the connections of the tunnel diodes 38, may be reversed whereby the tunnel diodes will normally be set to their low-voltage stable states. The transistors 42 will therefore be non-conductive in the absence of prior input pulses, a condition opposite to that heretofore described. By making this circuit change, the level of the differentiated input pulses will now have to exceed the peak current level of the tunnel diodes rather than the valley current level. This change might be advantageous in applications where a second biasing source is available and where the peak current level of the tunnel diode is more accurately defined than is the valley current level.

While, in accordance with the provisions of the statutes, there has been illustrated and described the best form of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure Letters Patent is:

1. A shift register circuit comprising, in each of a plurality of serially connected stages, a tunnel diode having a pair of terminals, said diode being connected to a D.C. source such at said diode may be forward-biased and operated at one or the other of two stable states, a transistor having input and output elements, means connecting said terminals in current-controlling relation to said transistor input elements, means including a differentiating network and a first asymmetrically conductive device for coupling an input signal to said pair of terminals, said input signal being adapted when active to switch said diode to one of its two stable states, means for coupling a shift signal to said pair of terminals, said shift signal being adapted when active to switch said diode to the other of its two stable states, and means including a second asymmetrically conductive device for coupling a hold-pulse signal to the output elements of said transistor to selectively control the current flowing between said output elements.

2. A shift register circuit comprising, in each of a plurality of serially connected stages, a tunnel diode having a pair of terminals, said diode being connected to a D.C. source whereby said diode may be forward-biased and operated at one or the other of two stable states, a transistor having input and output elements, means connecting said terminals in current-controlling relation to said transistor input elements, means for coupling an input signal to said pair of terminals, said input signal being adapted when active to switch said diode to one of its two stable states, means for coupling a shift signal to said pair of terminals, said shift signal being adapted when active to switch said diode to the other of its two stable states, and means for coupling a hold signal to the output elements of said transistor to selectively control the current flowing between said output elements.

3. A shift register circuit comprising, in each of a plurality of serially connected stages, a semiconductor diode having a pair of terminals, said diode having a characteristic including a pair of instability current levels and connected to a D.C. source so that said diode may be forward-biased and operated at one or the other of two stable states, a transistor having input and output elements, means connecting said terminals in current-controlling relation to said transistor input elements, means for coupling an input signal to said pair of terminals, said input signal being adapted when active to switch said diode to one of its two stable states, means for coupling a shift signal to said pair of terminals, said shift signal being adapted when active to switch said diode to the other of its two stable states, and means for coupling a hold signal to the output elements of said transistor to selectively control the current flowing between said output elements.

4. In combination, a transistor having a base, an emitter and a collector, a tunnel diode having an anode and a cathode, means for resistively coupling the anode of said diode to a positive biasing potential, said diode having its cathode terminal connected to a ground reference whereby said diode may be operated at one or the other of two stable states, means coupling the base and emitter of said transistor to the terminals of said diode whereby said transistor is conductive in its base-emitter path when said diode is in the first one of said stable states and non-conductive when said diode is in the other one of said stable states, a pair of input signal sources resistively coupled to the anode of said diode, the first of said pair of sources being adapted when active to switch said diode to one of its two stable states and the other of said pair of sources being adapted when active to switch said diode to the other of its two stable states, and a third input signal means asymmetrically coupled to the collector of said transistor to selectively control the collector voltage of said transistor.

5. In combination, a transistor having a base, an emitter and a collector, a tunnel diode having an anode and a cathode, means for resistively coupling the cathode of said diode to a negative biasing potential, said diode having its anode terminal connected to a ground reference whereby said diode may be operated at one or the other of two stable states, means coupling the base and emitter of said transistor to the terminals of said diode whereby said transistor is conductive in its base-emitter path when said diode is in the first one of said stable states and non-conductive when said diode is in the other one of said stable states, a pair of input signal sources resistively coupled to the cathode of said diode, the first of said pair of sources being adapted when active to switch said diode to one of its two stable states and the other of said pair of sources being adapted when active to switch said diode to the other of its two stable states, and a third input signal means asymmetrically coupled to the collector of said transistor to selectively control the collector voltage of said trainsistor.

6. In combination, a transistor having input and output elements, a tunnel diode having a pair of terminals, said diode being connected to a biasing source so that said diode may be operated at one or the other of two stable states, means connecting said terminals in current-controlling relation to said transistor input elements, a pair of input signal sources coupled to said terminals of said diode, the first of said pair of sources being adapted when active to switch said diode to one of its two stable states and the other of said pair of sources being adapted when active to switch said diode to the other of its two stable states, and a third input signal means connected to the output elements of said transistor to selectively control the current flowing between said output elements.

7. In combination, a transistor having input and output elements, a semi-conductor diode having a pair of terminals, said diode having a characteristic including a pair of instability current levels and being connected to a biasing source so that said diode may be operated at one or the other of two stable states, means connecting said terminals in current-controlling relation to said transistor input elements, input signal means coupled to said terminal of said diode to selectively switch said diode between one or the other of its two stable states, and a third input signal means connected to the output elements of said transistor to selectively control the current flowing between said output elements.

8. A shift register circuit comprising a plurality of cascaded bistable stages, each of said stages including a tunnel diode, said tunnel diode having an anode and a cathode lead, a positive power supply terminal, a ground terminal, said tunnel diode having its cathode lead connected to said ground terminal and its anode lead connected to one end of a first resistor, said first resistor having its other end connected to said power supply terminal whereby said tunnel diode is biased to operate in its bistable mode and is adapted to provide a first or a second stable voltage state thereacross, a transistor having a base, an emitter and a collector, said emitter being coupled to said ground terminal, said base being coupled to the anode lead of said tunnel diode whereby said transistor is adapted to be non-conductive in its base-emitter path when said tunnel diode is in said first stable voltage state and conductive in its base-emitter path when said tunnel diode is in said second stable voltage state, means for resistively coupling the collector of said transistor to a biasing source, an output terminal connected to the collector of said transistor, an input terminal adapted to receive input signals, a differentiating network connected between said input terminal and the anode of a second diode, said second diode having its cathode resistively coupled to the anode of said tunnel diode, a third diode having its cathode connected to the collector of said transistor, a common shift-pulse line, means for resistively coupling the anode of said tunnel diode in each of said stages to said shift-pulse line, a common hold-pulse line adapted to receive hold pulses in synchronism with said input signals, and means for coupling the anode of said third diode in each of said stages to said hold-pulse line.

9. A shift register circuit comprising a plurality of cascaded bistable stages, each of said stages including a tunnel diode having an anode and a cothode lead, a negative power supply terminal, a ground terminal, said tunnel diode having its anode lead connected to said ground terminal and its cathode lead connected to one end of a first resistor, said first resistor having its other end connected to said power supply terminal whereby said tunnel diode is biased to operate in its bistable mode and is adapted to provide a first or a second stable voltage state thereacross, a transistor having a base, an emitter and a collector, said emitter being coupled to said ground terminal, said base being coupled to the cathode lead of said tunnel diode whereby said transistor is adapted to be conductive in its base-emitter path when said tunnel diode is in said first stable voltage and non-conductive in its base-emitter path when said tunnel diode is in said second stable voltage state, means for resistively coupling the collector of said transistor to said power supply terminal, an output terminal connected to the collector of said transistor, an input terminal adapted to receive input signals, a differentiating network connected between said input terminal and the anode of a second diode, said second diode having its cathode resistively coupled to the cathode of said tunnel diode, a third diode having its cathode connected to the collector of said transistor, a shift-pulse line, means for resistively coupling the cathode of said tunnel diode in each of said stages to said shift-pulse line, a hold-pulse line adapted to receive hold pulses in synchronism with said input signals, and means for coupling the anode of said third diode in each of said stages to said hold-pulse line.

10. A shift register circuit comprising a plurality of cascaded bistable stages, each of said stages including a tunnel diode having an anode and a cathode lead, a negative power supply terminal, a ground terminal, said tunnel diode having its anode lead connected to said ground terminal and its cathode lead connected to one end of a first resistor, said first resistor having its other end connected to said power supply terminal whereby said tunnel diode is biased to operate in its bistable mode and is adapted to provide a first or a second stable voltage state thereacross, a PNP conductivity type transistor having a base, an emitter and a collector, said emitter being connected to said ground terminal, a second resistor connected between the base of said transistor and the cathode lead of said tunnel diode whereby said transistor is adapted to be conductive in its base-emitter path when said tunnel diode is in said first stable voltage state and non-conductive in its base-emitter path when said tunnel diode is in said second stable voltage state, a third resistor connected between the collector of said transistor and said power supply terminal, an output terminal connected to the collector of said transistor, an input terminal adapted to receive input signals, a differentiating network connected between said input terminal and the anode of a second diode, said second diode having its cathode resistively coupled to the cathode of said tunnel diode, a third diode having its cathode connected to the collector of said transistor, a common shift-pulse line, means for resistively coupling the cathode of said tunnel diode in each of said stages to said shift-pulse line, a common hold-pulse line adapted to receive hold pulses in synchronism with said input signals, and means for coupling the anode of said third diode in each of said stages to said hold-pulse line.

References Cited by the Examiner

UNITED STATES PATENTS

| | | | |
|---|---|---|---|
| 3,062,973 | 11/62 | Shea | 307—88.5 |
| 3,102,209 | 8/63 | Pressman | 307—88.5 |
| 3,109,108 | 10/63 | Fennick et al. | 307—88.5 |

OTHER REFERENCES

Amodie and Kosonocky, "Nondestructive Tunnel Diode Memory Cell," RCA TN No. 468, September 1961, pages 3, 4 and 5.

Fisher, "Transistor-Esaki Diode Shift Register," IBM, vol. 4, No. 9, February 1962, pages 45 and 46.

General Electric, "Tunnel Diode Manual," Fig. 5.2, pages 44 and 45, March 20, 1961.

JOHN W. HUCKERT, *Primary Examiner.*

DAVID J. GALVIN, *Examiner.*